US006843568B2

(12) United States Patent
Schenk et al.

(10) Patent No.: US 6,843,568 B2
(45) Date of Patent: Jan. 18, 2005

(54) PROJECTION APPARATUS

(75) Inventors: Harald Schenk, Dresden (DE); Alexander Wolter, Dresden (DE); Markus Schwarzenberg, Dresden (DE)

(73) Assignee: Fraunhofer-Gessellschaft, Munich (DE)

( * ) Notice: Subject to any disclaimer, the term of this patent is extended or adjusted under 35 U.S.C. 154(b) by 0 days.

(21) Appl. No.: 10/818,462

(22) Filed: Apr. 5, 2004

(65) Prior Publication Data

US 2004/0218155 A1 Nov. 4, 2004

Related U.S. Application Data

(63) Continuation of application No. PCT/EP01/11510, filed on Oct. 5, 2001.

(51) Int. Cl.[7] .................. G03B 21/00; G03B 21/28; G02B 26/08
(52) U.S. Cl. ................ 353/46; 353/50; 353/51; 353/122; 359/197; 359/203; 359/212; 359/223; 359/226
(58) Field of Search ................ 353/122, 46, 50–51; 359/196–197, 203, 212, 223, 225, 226

(56) References Cited

U.S. PATENT DOCUMENTS

| | | | | |
|---|---|---|---|---|
| 3,621,133 A | | 11/1971 | Baker et al. | 348/205 |
| 5,187,612 A | * | 2/1993 | Plesko | 359/896 |
| 5,371,347 A | * | 12/1994 | Plesko | 235/462.15 |
| 6,076,732 A | * | 6/2000 | Lan et al. | 235/457 |
| 6,147,822 A | | 11/2000 | Yamada et al. | 359/618 |
| 6,285,489 B1 | | 9/2001 | Helsei et al. | 359/291 |

FOREIGN PATENT DOCUMENTS

WO PCT/EP2001/01151 6/2004

OTHER PUBLICATIONS

Wine, David M., Helsel, Mark P., Jenkins, Lorne, Urey, Hakan, Osborne, Thor D., "Performance of a Biaxial MEMS–Based Scanner for Microdisplay Applications", proceedings of SPIE, vol. 4178 (2000), (11 pages).

Schweizer, Sandra, Cousseau, Schiesser, Sebastin, Lammel, Gerhard, Calmes, Sam, and Renaud, Philippe, "Thermally Actuated Microprojector for Optical Display Applications", proceedings of SPIE, vol. 4178 (2000), (11 pages).

Halelin, Paul, Cornett, Kimberly and Solgaard, Olav, "Micromachined Mittors in a Raster Scanning Display System", IEEE 1998, (3 pages).

Lemme, Helmuth, "Bildprojektoren überholen Gro displays", Elektronik, Feb. 1996, (9 pages).

Kays, Rüdiger, "Eidophor–Projektor für erhöhte Bildqualität", Fernesh– und Kino–Tech–nik, May 1985, (4 pages).

Hagelin, Paul M. and Solgaard, Olay, "Optical Raster–Scanning Displays Based on Surface–Micromachined Polysilicon Mirrors", IEEE Journal of Selected Topics in Quantum Electronic, vol. 5, No. 1, Jan./Feb. 1999, (5 pages).

Conant, Robert A., Hagelin, Paul M., Krishnamoorthy, Uma, Solgaard, Olav, Lau, Kam Y., Muller, Richard S., "A Raster–Scanning Full–Motion Video Display using Polysilicon Micromachined Mirrors", Transducers, Jun. 7–10, 1999, (4 pages).

Urey, Hakan, Wine, David W., Osborn, Thor D., "Optical Performance Requirements for MEMS–scanner based Microdisplays", proceedings of SPIE vol. 4178 (2000), (10 pages).

* cited by examiner

Primary Examiner—Judy Nguyen
Assistant Examiner—Magda Cruz
(74) Attorney, Agent, or Firm—Maginot, Moore & Beck (57) ABSTRACT

The present invention is based on the finding that the previous column and row representation in the scanning image projection has to be given up, in order to enable that the ratio between row and column frequency or vertical and horizontal deflection frequency is not critical and may be decreased. An inventive projection apparatus for projecting an image on an image field includes a deflection means for deflecting a light beam about a first deflection axis at a first deflection frequency and about a second deflection axis at a second deflection frequency different from the first, in order to move the light beam across the image field, as well as a modulation means for modulating an intensity of the light beam depending on the image to be projected. The first and second deflection frequencies differ by less than an order of magnitude.

19 Claims, 3 Drawing Sheets

PROJECTION APPARATUS

CROSS-REFERENCE TO RELATED APPLICATION

This application is a continuation of co-pending International Application No. PCT/EP01/11510, filed Oct. 05, 2001, which designated the United States and was not published in English.

BACKGROUND OF THE INVENTION

1. Field of the Invention

The present invention relates to projection apparatuses and in particular to miniaturized low-cost light projectors, as they are used for the representation of images, patterns, characters, or symbols or for the illumination of a photosensitive material.

2. Description of the Related Art

For the projection of images, either parallel methods, as it is the case for example with LCDs (liquid crystal displays) or with micro-mirror arrays, or scanning methods are used, as they are for example realized by a biaxially movable or two uniaxially movable mirrors. Disadvantageously, in the parallel methods, a comparably large substrate area in manufacturing and also a complex test procedure are required. Both result in a comparably high price for parallel-type projectors, so that methods working in parallel are not considered for a low-cost projection apparatus.

In the scanning methods, the projectors include one or two movable mirrors enabling deflection of a light beam about two deflection axes and two-dimensional deflection of the light beam, respectively. By the deflection, the light point generated by the light beam is moved on the image field, the intensity of the light beam meanwhile being modulated depending on the instantaneous projection place of the light point on the image field.

In order to enable a high degree of miniaturization with concurrently low production costs, micromechanically manufactured movable mirrors are employed in the scanning-type projectors. With the previous scanning-type systems, the projection is always based on a column and row representation of the image. In order to enable this column and row representation, in these systems the row frequency, i.e. the frequency of the deflection of the light beam or the light point in a horizontal direction, is small relative to the column frequency, i.e. the frequency of the deflection of the light beam along the vertical direction. The mutual ratio of these frequencies sets the amount of the resolvable rows and can only be increased by a so-called interlace method, in which at first all even-numbered rows and then all odd-numbered rows of an image are alternately scanned or represented.

In micromechanically manufactured scanning projectors or scanners, the achieving of low eigenfrequencies or resonance frequencies poses a fundamental problem, since the mechanical stability of the system decreases with the eigenfrequency. If the vertical deflection is to be excited in resonance or resonantly, the deflection mirror or the deflection mirrors thus have to be operated at a correspondingly even greater horizontal frequency. Alternatively, the vertical deflection has to be performed in the quasi-static operation, in order to be able to resonantly create a horizontal deflection. In the case of a resonant vertical row deflection of the light beam, a problem is that the horizontal column frequency has to be great relative to an anyway great resonant row frequency. The great horizontal deflection frequencies occurring therein induce dynamic deformation of the mirror plate, which leads to resolution problems in the projection. In the case of the quasi-static vertical row deflection, very high operating powers are required that make miniaturization of the control of the deflection unit or the mirrors impossible or the deflection unit very expensive. These problems also cannot be eliminated by a decrease of both frequencies, since the row frequency or the vertical frequency determines the image repetition frequency, and a too low image repetition frequency leads to a flickering of the image.

In Hagelin, P. M., Solgaard, O.: "Optical Raster-Scanning Displays Based on Surface Micromachined Polysilicon Mirrors" IEEE J. Selected Topics in Quantum Elecr., Volume 5, No. 1 (1999), pp. 67–74 as well as in the articles Hagelin, P. etc.: "Micromachined Mirrors in a Raster Scanning Display System", Broadband Optical Networks and Technologies: an emerging reality. IEEE/LEOS summer topical meeting (1998), pp. 109–110, and Conant, R. etc.: "A raster-scanning fill motion video display using polysilicon micromachined mirrors", Transducers +99, Int. Conf. Solid-State Sensors and Actuators, Sendai (1999), pp. 376–379, a projection apparatus is described that is based on the use of two electrostatically excited micromechanical movable mirrors. The low-frequency row deflection in a vertical direction is accomplished by a quasi-statically deflected mirror, while the high-frequency horizontal column deflection is obtained by a mirror excited in resonance. The frequency ratio is 6.2 kHz:20 Hz. The amount of the representable rows is limited to 310 by the frequency ratio. Corresponding to the row frequency, the image repetition rate is 20 Hz. It is disadvantageous in this projection apparatus that the image repetition rate is so low that the projected image is perceived as flickering. Moreover, the high-frequency operated mirror has dynamic deformations leading to significant resolution limitations, in particular at the image margin. The increase of the image repetition rate at a constant number of rows or an increase of the row number, as they could be achieved by an increase of the frequency of the high-frequency mirror, do not make sense due to the occurring dynamic deformations or lead to non-tolerable image flaws.

In Urey, H.; Wine, D.; T.; Osborn; "Optical Performance requirements for MEMS-scanner based microdisplays", Proc. SPIE Volume 4178 (2000), pp. 176–185, and Wine, D. etc.: "Performance of a biaxial MEMS-based Scanner for Microdisplays Applications", Proc. SPIE Vol. 4178 (2000), pp. 186–196, a projection apparatus is described that is based on the use of a biaxially suspended mirror. The low-frequency vertical deflection is conducted quasi-statically, while the high-frequency horizontal deflection is created resonantly. The vertical deflection frequency is about 55 Hz. The horizontal deflection frequency has been adjusted to 18 kHz in order to accomplish a row number of about 350. With this high horizontal deflection or column frequency, the dynamic deformation of the mirror plate is so great that, in particular at the margin area of the image, distinct resolution deteriorations occur.

In Schweizer, S. etc.: "Thermally actuated microprojector for optical display applications", Proc. SPIE Vol. 4178 (2000), pp. 165–175, a projection apparatus is described that is based on the use of a mirror that may be excited to two vibrations at the same time, wherein the vibration axes are perpendicular to each other. The low-frequency vertical deflection is achieved by a quasi-static deflection of the mirror, while the high-frequency horizontal deflection is conducted in resonance. The image repetition rate is 50 Hz. The amount of the resolvable rows is limited to 100 rows by the vertical frequency of 5 kHz. In the margin area the image quality is lower than in the image center due to the dynamic deformation.

SUMMARY OF THE INVENTION

It is the object of the present invention to provide a projection apparatus having better image quality and/or a less expensive construction and a method for projecting an image on an image field.

In accordance with a first aspect, the present invention provides a projection apparatus for projecting an image on an image field, having a deflection means for deflecting a light beam about a first deflection axis and about a second deflection axis in order to move the light beam across the image field; and a modulation means for modulating an intensity of the light beam depending on the image to be projected, wherein the first and second deflection frequencies differ by less than an order of magnitude, characterized in that the deflection means is formed such that the light beam is deflected about the first deflection axis at a first deflection frequency $f_1$ and about the second deflection axis at a second deflection frequency $f_2$, wherein the deflection means has means adjusting the frequency ratio to $f_1:f_2=n:m$, with m and n being unequal integers, so that the light beam describes a Lissajous figure on the image field and repeatedly passes through it with a repetition frequency $f_r$ of $f_r=f_1/n=f_2/m$.

In accordance with a second aspect, the present invention provides a method for projecting an image on an image field, having the steps of deflecting a light beam about a first deflection axis and about a second deflection axis, in order to move the light beam across the image field; and modulating an intensity of the light beam depending on the image to be projected, wherein the first and second deflection frequencies differ by less than an order of magnitude, characterized in that the step of deflecting is performed such that the light beam is deflected about the first deflection axis at a first deflection frequency $f_1$ and about the second deflection axis at a second deflection frequency $f_2$, for which $f_1:f_2=n:m$ applies for unequal integers n and m, so that the light beam describes a Lissajous figure on the image field and repeatedly passes through it with a repetition frequency $f_r$ of $f_r=f_1/n=f_2/m$.

The present invention is based on the finding that it has to be given up on the previous column and row representation in the scanning image projection, in order to enable the ratio between row and column frequency or vertical and horizontal deflection frequency not to be critical and to be able to be decreased. This a distinct advantage in particular for micromechanical deflection mirrors. In this way it is made possible to adjust both the row and the column frequency to frequencies in the vicinity of the eigenfrequency or resonance frequency of the deflection means, such as a biaxially suspended or two uniaxially suspended mirrors, so that they can be small enough on the one hand, so that the dynamic deformation of a deflection mirror does not impede the image quality, and large enough on the other hand, so that sufficient mechanical stability is guaranteed. Due to these lower requirements for the ratio of the two deflection frequencies, with use of mirrors a dynamic deformation of a mirror plate, as it occurs in the projectors with image construction by column and row, is avoided. On the other hand, no slow quasi-static operation in one of the deflection directions is required, so that the operation power may be decreased, the control of the mirror or the mirrors be miniaturized, and the deflection means be made less expensive in general.

An inventive projection apparatus for projecting an image onto an image field includes a deflection means for deflecting a light beam about a first deflection axis at a first deflection frequency and about a second deflection axis at a second deflection frequency different from the first, in order to move the light beam across the image field, as well as a modulation means for modulating an intensity of the light beam depending on the image to be projected. The first and second deflection frequencies differ by less than an order of magnitude, or the ratio $f_>/f_<$ between the greater deflection frequency $f_>$ and the smaller deflection frequency $f_<$ is smaller than ten ($f_>/f_<<10$). Hereby, a representation by column and row is avoided.

According to a particular embodiment, the deflection means consists of one biaxially suspended mirror or two uniaxially suspended mirrors having two deflection axes in order to enable two-dimensional deflection of the light beam. The deflection of the light beam about the deflection axes takes place with two deflection frequencies differing by less than an order of magnitude. The frequencies of the deflection both about the one and about the other deflection axis may be in the vicinity of the resonance frequencies with reference to the two axes. Since the deflection frequencies only differ slightly, the image is not created in the form of column and row. The two deflection frequencies are adjusted, such that they have a greatest common divisor. In this way the movement of the light beam or the movement of the light point that the light beam creates on the image field, such as an image plane, is repeated with an image repetition rate corresponding to the greatest common divisor of the two deflection frequencies. With such adjusted deflection frequencies, the path the light beam describes on the image field may substantially be described as a Lissajous figure. While the light beam or the light point is moved by means of the slightly deviating deflection frequencies, the intensity of the light beam is modeled so as to create light points of desired brightness at the momentary projection places. For the modulation of the intensity of the light beam or the light point created thereby on the image field, the image data describing the image is suitably rendered, such as by changing the order of an input data stream of pixel values of the image data and outputting it in altered order, by interpolating the image at places corresponding to the course of the light point the light point describes on the image field, or by adjusting the light beam intensity according to that pixel of a bitmap or pixel array to be projected in whose associated image field area the momentary projection place of the light beam on the image field is. In the case of the fractioned rational ratio between the two deflection frequencies, the rendition of the image data is required only once per image, so that the amount of calculation may be kept low for this.

A further advantage of the present invention is that, in contrast to the interlace method, in some conventional scanning methods scanning the image by column and row, as it is for example described in Kays, R.: "Eidophor-Projektor für erhöhte Bildqualität", Fernseh- und Kinotechnik, 39th year, No. 5 (1985), pp. 231–234, no wobbling of the image in a vertical direction due to the alternate representation of even-numbered and odd-numbered rows occurs, because the representation does not take place by column and row.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
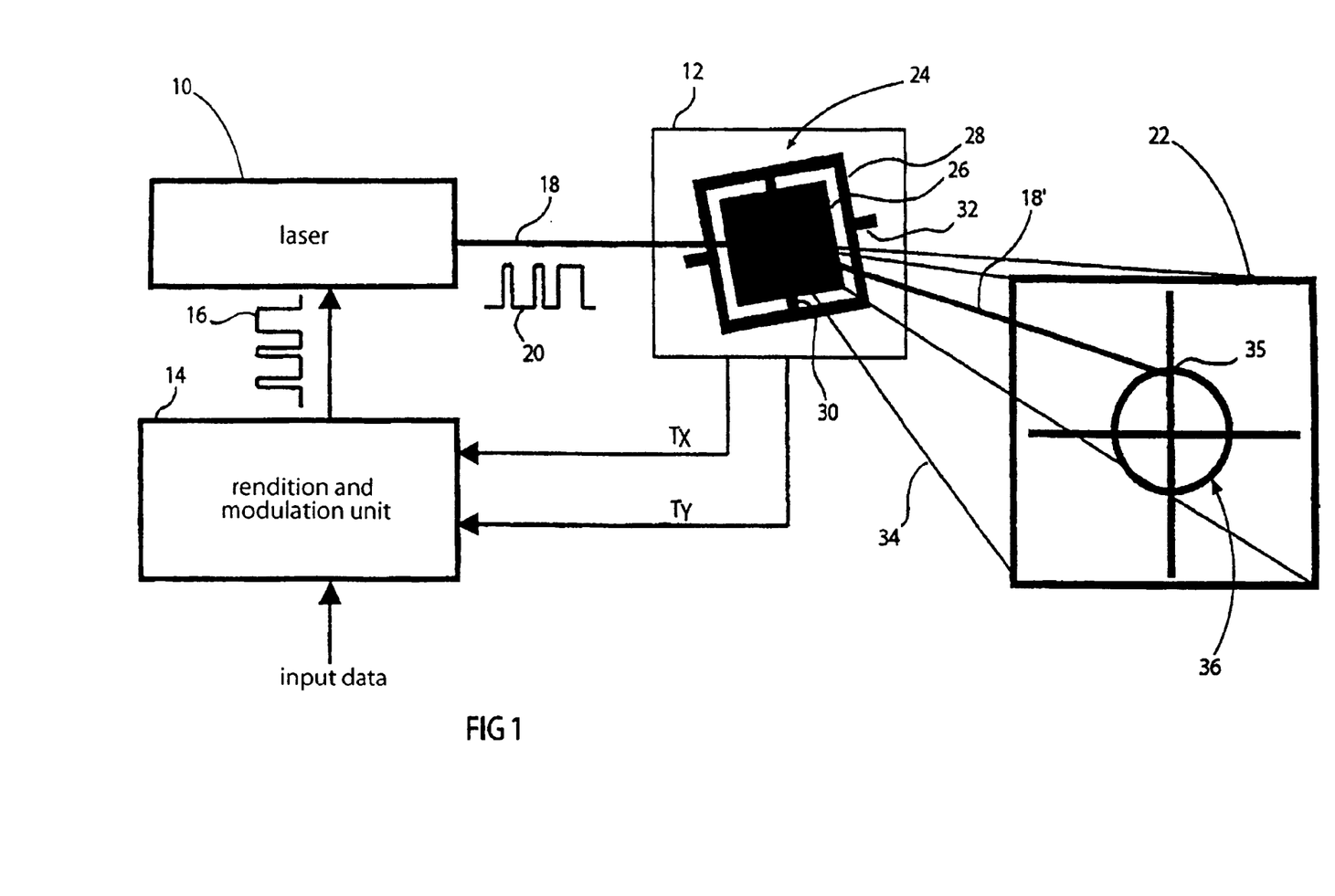
FIG. 1 shows a schematic drawing of a projection apparatus according to an embodiment of the present invention.

With reference to FIG. 1, the construction of a projection apparatus according to one embodiment of the present invention is described first. It is pointed out that for better understanding the illustration of FIG. 1 is not embodied to scale. Furthermore, FIG. 1 is related to the projection apparatus for the monochrome representation of an image, although the present invention is also applicable to projection apparatuses providing the colored representation of an image.

The projection apparatus of claim 1 includes a laser 10, a deflection means 12 and a rendition and modulation unit 14. The rendition and modulation unit 14 receives at an input input image data representing the image to be projected and is connected to a control input of the laser 10 via an output, in order to send the digital control signal 16 thereto, by which the intensity of a laser beam 18 sent out from the laser 10 is modulated, as it is schematically illustrated by an intensity profile 20 corresponding to the profile of the control signal 16. The laser beam 18 is deflected to or in the direction of an image field 22 by the deflection means 12, the deflection means enabling two-dimensional deflection of the light beam 18. The deflected laser beam is indicated with 18'.

In the present embodiment, the deflection means 12 includes a micromechanically manufactured, biaxially suspended mirror 24, wherein alternatively two micromechanically manufactured, uniaxially suspended mirrors could however also be used. The biaxially suspended mirror 24 consists of a rectangular mirror plate 26 as well as a rectangular frame 28. In order to enable the biaxial suspension and thus a rotation of the mirror plate 26 about two axes, the rectangular mirror plate 26 is suspended or journaled in a centered manner at the frame 28 via a first deflection axis 30. Perpendicularly to the first deflection axis 30, the frame 28 is journaled in a centered manner at a second deflection axis 32 being perpendicular to the first deflection axis 30. At the suspensions along the two deflection axes 30 and 32, the biaxially suspended mirror experiences return forces at deflections about the axes 30 or 32 about a rest position, because of which it has eigenfrequencies or resonance frequencies with reference to the two axes 30 and 32.

The deflection means 12 further includes a control (not shown), in order to vibrate the biaxially suspended mirror 24 about the deflection axes 30 and 32, whereby the light beam 18 is deflected about the first deflection axis at a first deflection frequency $f_1$ and about the second deflection axis 32 at a second deflection frequency $f_2$. Both deflection frequencies $f_1$ and $f_2$ are adjusted to frequencies in the vicinity of their eigenfrequencies and differ only slightly. Moreover, the deflection frequencies $f_1$ and $f_2$ are adjusted such that they have a fractioned rational ratio. The maximum deflections or the reversal points of the vibrations about the two deflection axes 30 and 32 define a solid angle segment 34 within which the deflected beam 18' moves and that spans the image field 22. Due to the deflection frequencies, a light point 35 created by the deflected laser beam describes a Lissajous figure, as it is described in the following.

The deflection means 12 is connected to two further inputs of the rendition and modulation unit via two outputs, in order to send trigger signals Tx and Ty thereto that indicate when the vibration about the first or the second deflection axis 30 or 32, respectively, is at its upper or lower reversal point. As it is described in the following, the trigger signals Tx and Ty serve for the synchronization of the rendition and modulation unit 14 with the deflection means 12.

The deflection of the light beam 18 together with the modulation of the intensity of the light beam 18, as it is described in the following, yields an image 36 within the image field 22, wherein in FIG. 1 a cross with a circle whose center lies in the cross point of the cross is shown only exemplarily as image.

After the construction of the projection apparatus of FIG. 1 has been described previously, the functioning thereof or the projection method it is based on is described in the following.

In the following, first the deflection of the laser beam 18 is explained, as it is conducted by the deflection means 12. As it has been previously described, the biaxially suspended mirror 24 is vibrated about the deflection axes 32 and 30 at deflection frequencies f1 and f2, respectively, that are equal or about equal to resonance frequencies of the mirror 24 with respect to the deflection axes 30 and 32. In other words, the biaxially suspended mirror 24 is operated on or in the vicinity of its resonance frequencies. The two resonance frequencies $f_1$ and $f_2$ preferably only differ slightly, e.g. by less than an order. In the case of a high quality of the resonators of the biaxially suspended mirror 24, the connection between the time on the one hand and the two deflection angles of the light beam 18' on the other may be described in very good approximation by a sinusoidal function. In order to keep the deflection frequencies $f_1$ and $f_2$ of the biaxially suspended mirror 24 constant, for example a reference voltage signal is fed to the control of the deflection means 22 from the rendition and modulation unit 14, whose progress in time corresponds to the target progress of the deflection angle of at least one of the two vibrations about the deflection axes 30 and 32.

In addition, the two deflection frequencies $f_1$ and $f_2$ are adjusted such that they have a greatest common divisor. The greatest common divisor corresponds to the image repetition rate $f_r$, i.e. the rate with which the light point 34 created by the light beam 18' reaches the same position again on the image field 22 after a fixed default course. In the present case, since the two vibration or deflection axes 30 and 32 are perpendicular to each other, and for the case that the frequency ratio of the two deflection frequencies $f_1$ and $f_2$ is $f_1:f_2=n:m$, wherein n and m are integers (i.e. n,m ∈ |N) and indicate the smallest common divisors, the following applies for the image repetition rate $f_r$:

$$f_r = f_1/n = f_2/m.$$

Figure 2:
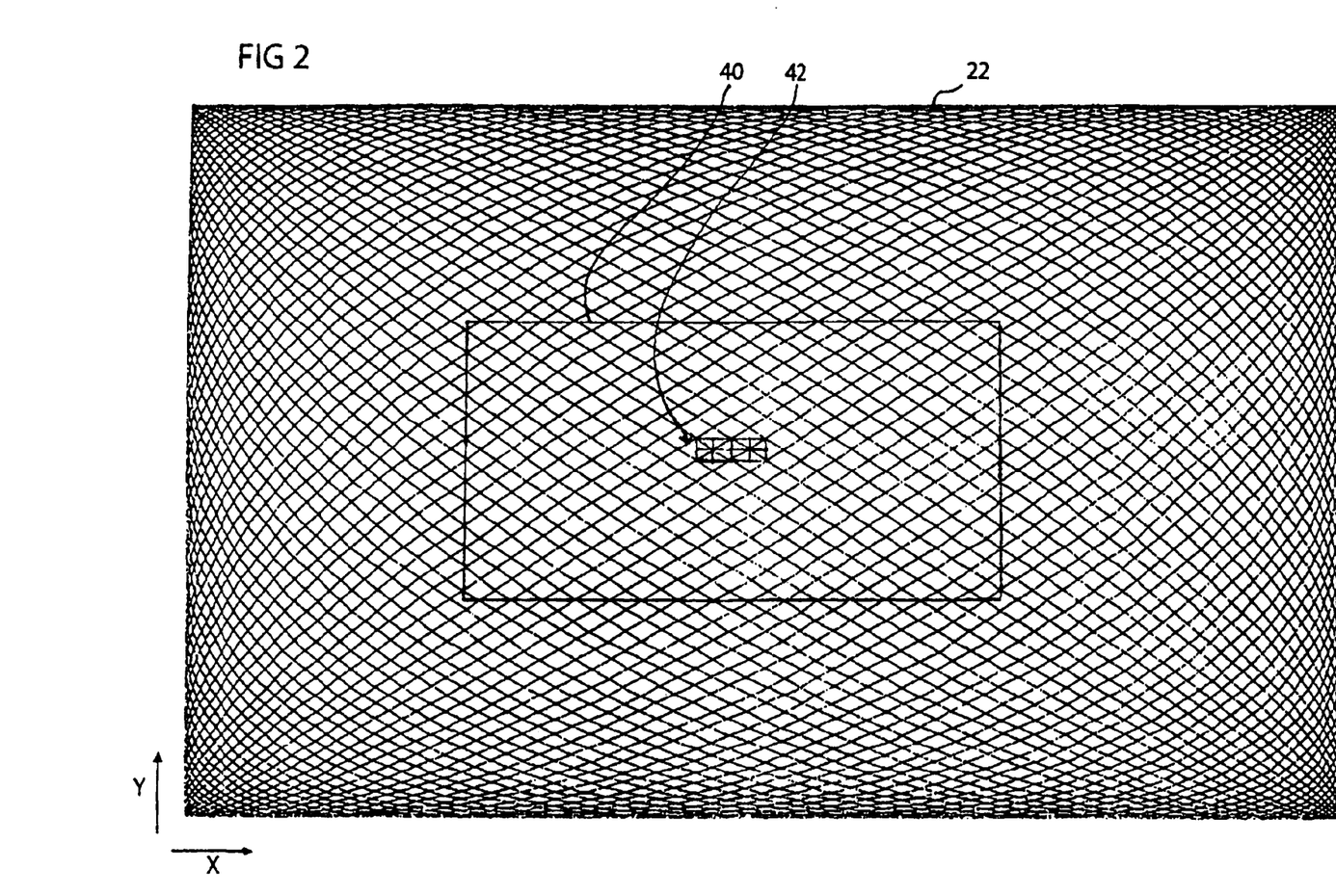
FIG. 2 shows a predetermined course the light beam of the projection apparatus of claim 1 describes on the image field if the ratio of the two deflection frequencies is 50:51.
Figure 3:
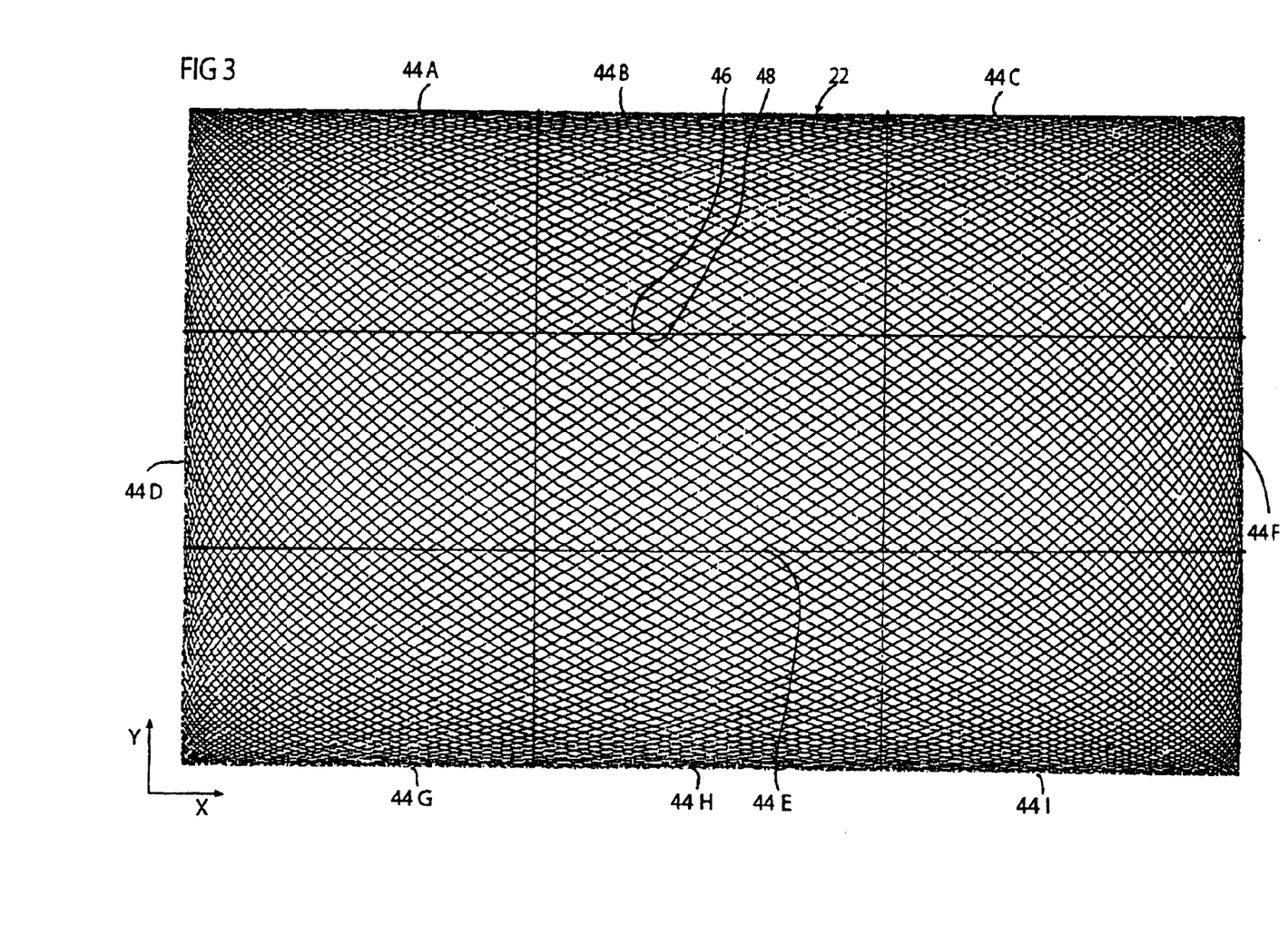
FIG. 3 shows a predetermined course the light beam of the projection apparatus of claim 1 describes on the image field if the ratio of the two deflection frequencies is 70:71.

The light point created by the deflected light beam 18' using the deflection frequencies $f_1$ and $f_2$ substantially follows a Lissajous figure on the image field 22, as it is shown in FIGS. 2 and 3 for special frequency ratios. The deflected light beam 18' is deflected by the deflection means 12 such that the light beam 18' repeatedly scans the course of the Lissajous figure at the image repetition rate $f_r$.

FIG. 2 shows the Lissajous figure the light beam 18' describes on the image field 22 for the case that the frequency ratio is $f_1:f_2=50:51$, while FIG. 3 illustrates the Lissajous figure for the frequency ratio $f_1:f_2=70:71$. In both figures it is assumed that the deflection axes 30 and 32 are aligned such that they are parallel to the image field 32 and that the rotation of the mirror plate 26 about the deflection axis 30 causes movement of the light point 35 created by the deflected light beam 18' along the horizontal axis x, while the deflection of the biaxially suspended mirror 24 about the deflection axis 32 causes movement of the light point 35 along the vertical axis y. Correspondingly, the vibration about the deflection axis 30 is at a reversal point if the light point is at the left or right margin of the image field 22, and the vibration about the deflection axis 32 is at a reversal point if the light point is at an upper or lower margin of the image field 22.

If one associates each intersection of the Lissajous figure with an image point, i.e. a point on the image field at which a light point 35 with desired brightness is to be created by modulation of the light beam 18, in order to result in the image to be projected together with other image points, and counts each reversal point as half an intersection, the following applies for the number N of the image points defined in this way:

$$N = n \times m$$

According to this definition of the image points, the number of the image points in the case of FIG. 2 is 50×51 (=2550), while in the case of FIG. 3 it is 70×71 (=4970).

In the case of FIG. 2, an image repetition rate of 50 Hz may be accomplished if the horizontal frequency $f_1$ is 2500 Hz and the vertical frequency $f_2$ 2550 Hz. In the case of FIG. 3, an image repetition rate of 60 Hz may be accomplished if the horizontal frequency $f_1$ is 4200 Hz and the vertical frequency $f_2$ 4260 Hz. In general, frequency adjustments with f1 and f2 >500 Hz and n and m greater 10 are preferred. But n and m may also differ by more, such as by not more than an order of magnitude ($1/10 < n/m < 10$).

As can be seen from the above equation for the number of intersection or image points N, the coverage of the image field depends on the chosen frequency ratio between the two deflection frequencies $f_1$ and $f_2$. As can be further seen from the two FIGS. 2 and 3, the image point density or the intersection point density of the Lissajous figure in the margin area of the image field 22 is greater than in the inner area. For the homogenization of the image point density, if required, the margin area of the image field 22 may be faded out, such as by switching off the light source 10 in this outer area. In FIG. 2 a window is exemplarily shown at 40, outside of which the laser 10 may be switched off.

Each point along the Lissajous figure may serve as image point of the image field 22 by a modulation of the intensity of the light beam 18. Deviating from the previous definition of the image point as the intersection points and reversal points, image points may for example be defined as those points of the Lissajous figure that lie between adjacent intersection points or are passed on the Lissajous figure in a temporarily equidistant manner, or all points on the figure in the case of a continuous modulation of the light beam intensity.

For example, in FIG. 2 eight adjacent image points are shown at 42, each of which is illustrated as a rectangle bordering on the adjacent image points. The image points 42 are defined such that they are disposed at the positions along the Lissajous figure that lie between adjacent intersection points thereof. Each rectangle representing an image point comprises two opposing corners lying on the line of the Lissajous figure, while the other opposing corners substantially lie in the gap between adjacent lines of the Lissajous figure in a centered manner.

Although in FIG. 2 only eight image points 42 are shown for clarity, it is recognizable that an expansion of the such defined image points 42 to the remaining area of the image field 22 also yields an arrayed arrangement of image points that are substantially arranged by column and row, although they become more dense towards the outside. Differing from the projection methods described in the Background of the Invention section, the image points 42 arranged in an arrayed manner, however, are not passed by row by the light point 35 created by the deflected laser beam 18'. Rather, for example the left upper image point and the lower right image point next to it are successively passed. As a result, in particular image points of other rows are passed even before all four image points of the upper row of the eight image points 42 are passed.

After the deflection of the light beam 18 by the deflection means 12 as well as the predetermined and reproducible movement resulting therefrom of the light point created by the deflected light beam 18' on the image field 22 has been described previously, in the following the modulation of the intensity of the light beam 18 to create light points with desired brightness at the image points is described.

The rendition and modulation unit 14 knows about the instantaneous position of the light point 35 created by the deflected light beam 18' on the image field at every point in time. Based on the input image data, the rendition and modulation unit 14 controls the laser 10 by means of the control signal 16 such that a light point with a desired intensity of brightness corresponding to the image defined by the input image date results at the instantaneous projection place at which the light point 35 created by the deflected light beam 18' currently is.

In order to obtain knowledge about the instantaneous position of the light point 35, the rendition and modulation unit 14 calculates the momentary projection place based on a known connection between the deflection angles of the biaxially suspended mirror 24 and the time, which is for example a sinusoidal connection, on the one hand and a known connection between the deflection angles and the coordinates on the image field 22 on the other. In order to temporally synchronize the rendition and modulation unit 14 with the deflection means 12, the deflection means 12 indicates the passing of reversal points in the Lissajous figure to the rendition and modulation unit 14 by the trigger signals Tx and Ty, whereby the data stream 16 of the rendition and modulation unit 14 complies with the deflection means 12.

As soon as the projection place of the light point on the image field 22 is at an image point, such as one of the image points 42, the rendition and modulation unit 14 outputs a corresponding control signal 16 to the laser 10 for modulation. Corresponding to the previous description in view of the possible definitions for image points, the rendition and modulation unit 14 determines the passing through an image point for example from a comparison of the ascertained instantaneous position of the light point 35 with the defined image points or by repeatedly taking the time of an amount of time in the case of temporally equidistant image points. The control signal 16 may be digital, analogue, phase-modulated or the like, in order to modulate the intensity of the laser either in several intensity gradations or binarily and either continuously or selectively. The control signal 16 for the control of the modulation of the light beam intensity may be realized by modulation of a current or a voltage.

The rendition and modulation unit 14 ascertains the value for the control signal 16 for the adjustment of the intensity of the light beam 18 on reaching an image position from the input image data representing the image to be projected. The input image data may for example be present in pixel format or in vector form but may also have a special format adapted to the projection apparatus of FIG. 1, as it is subsequently described.

A first possibility for the determination of the value for the control signal 16, in which the input image data may be present in any format, is that the rendition and modulation unit 14 interpolates the image defined by input image data at the position corresponding to the instantaneous light point position. In order to be able to perform the interpolation, the rendition and modulation unit 14 latches the input data for each image before its projection. The interpolation only has to be performed once per image for each image point, because the control signals 16 repeat with the image repetition rate $f_r$.

In the case that the image to be projected is present as a bitmap, i.e. an array of pixels, the image field may be divided according to the size of the bitmap into columns and rows or in the form of a matrix or an array, such that the image field consists of image field areas arranged by column and row, each of which is associated with a different one of the pixels of the image to be projected. As long as the image point 35 created by the deflected light beam 18' is within the matrix or image field area or sweeps it, the rendition and modulation unit 14 adjusts the intensity of the light beam 18 according to the corresponding pixel value of the bitmap or the pixel value associated with this image field area. In FIG. 3 for example the division of the image field 22 into image field areas 44a–44i is illustrated for the greatly simplified case of a 3×3 pixel bitmap. If the deflected light beam 18' or its created light point 35 crosses through one of the image points on the Lissajous figure, its intensity is modulated by the rendition and modulation unit 14 according to that pixel in the bitmap in whose associated image field area 44a–44i it is. If the image points are for example defined as the intersection points of the Lissajous figure, the intensity is adjusted at all intersection points according to the pixel value in whose associated image field area 44a–44i they are. For an intersection point 46, the intensity is for example adjusted to the value of the pixel corresponding to the image field area 44b. If the modulation is performed continuously or all points of the Lissajous figure are image points, the rendition and modulation unit 14 keeps the intensity constant at the value of that pixel in whose image field area 44a–44i the image point currently is, as long as the image point 35 crosses through this image field area. The amount of image points per pixel may vary across the image field 22. Due to the increased density in the margin area, more image points per pixel exist there. Since the course of the light point 35 on the image field 22 is fixed and known a priori (as well as the division of the image field into image field areas 44a–44i), the rendition and modulation unit 14 may take the increased number of image points for a pixel into account by reducing the intensity for the image points of this pixel.

It should be understood that, in contrast to conventional scanning image projection methods, at first pixels of different rows are written or the image field areas of different rows are scanned before the pixels or the image field areas of a complete row of the image are written or scanned. After the image point 46 the light beam 18' for example first reaches an image point 48 which however lies in another row. Only later does the light beam again reach the other image field areas 44a and 44c of the upper row.

A special case is present if the input image data are present in the pixel format or as an array of pixel values, i.e. the image points are arranged in a preferably two- or one-dimensional field, and the number of the rows and columns of the image points corresponds to the number of rows and columns of the pixel values. In this case it may be sufficient if the rendition and modulation unit 14 re-sorts the input image data of an image in order to correspond to the order in which the image points on the Lissajous figure are scanned by the light point 35. This is because the course of the Lissajous figure is known a priori and thus it is known a priori in which order the light point passes the image point of the window 40. The rendition and modulation unit 14 then only has to use the re-sorted values in turn each on reaching successive image points, in order to create the control signal 16 for the laser 10 therefrom. In this case interpolation is not necessary. In order to avoid distortion due to the increased density of the image points in the margin area of the image field 22, for example the margin area of the image field 22 may be faded out to accomplish uniform arrangement of image points without distortions. In FIG. 2, the image points of the window 40 may for example be defined like the image points 42 of FIG. 2, each image point of the window 40 being assigned a pixel value of the input data. The distortion occurring at the margin could for example also be corrected by suitable lenses arranged between the deflection means 12 and the image field 22. The rearrangement or re-sorting is facilitated due to the fact that the re-sorting is equal for each input image with equal pixel format, so that a fixed mapping regulation may be used for the rearrangement of the input data stream to an output data stream corresponding to the control signal 16.

But it is also possible that the input image data is fed to the rendition and modulation unit 16 in the order in which the image points are scanned, so that in this case no rendition by the rendition and modulation unit 16 would be required.

In order to be suited for various formats of the input image data, the rendition and modulation unit 16 may perform the modulation of the light beam intensity selectively in one of the previously described manners depending on a header of the input image data.

The projection apparatus previously described with reference to FIG. 1 may be used as a miniaturized low-cost light projector for the representation of images, patterns, characters, or symbols, as it may for example be used for the visual representation of movies, text- or image-based information or graphics. With the use of suitable light power and a photosensitive material, the projector may also be used for the generation of a replica into this material. Applications would be possible in portable computers, terminals, mobile telephones, lettering systems or in head-up displays.

An advantage of the projection apparatus of FIG. 1 is that, since the two frequencies used for the deflection of the light beam only differ slightly, such as by less than an order of magnitude, the deflection frequencies may on the one hand be kept so low that the dynamic deformation of the image quality is not impeded, but on the other hand are great enough to ensure sufficient mechanical stability. The connection between time and deflection angle or projection place is clearly not linear for both deflection directions. At high quality of the resonators, in particular the connection between time and deflection angle may be described in a very good approximation by a sinusoidal function. In comparison with the non-resonant operation, as it is required for a linear connection between time and deflection angle or projection place, and as it used in the systems described in the Background of the Invention section, lower power consumption corresponding to the quality of the oscillating mirror or the oscillating mirrors is necessary so that the control may also be miniaturized greatly, which may for example be made available as a printed circuit board (PCB) with surface mounted devices (SMD) or as an integrated circuit (IC). Since the deflection frequencies only differ slightly, the image is not created in column and row form, as this is the case in the conventional systems. In contrast to classical interlace methods in which wobbling of the image in a vertical direction occurs due to the alternate representation of even-numbered and odd-numbered rows, such wobbling is avoided in the projection apparatus of FIG. 1 by the covering of the image field according to a Lissajous figure. Accordingly, an image that is clearly calmer to the eye is created by the projection apparatus of FIG. 1.

Although the rendition and modulation unit previously determined the instantaneous projection place based on clock signals using the connection between the momentary deflection angles of the light beam and the time, it is also possible that the deflection unit feeds signals to the rendition and modulation unit that contain information about the instantaneous position or orientation of the deflection mirror, such as the momentary deflection angles of the light beam or the momentary deflection angles of the mirror, so that the determination may be made based on this information.

With respect to possible alternatives of the apparatus of FIG. 1, it should be understood that, although a deflection means 12 with a biaxially suspended mirror has been previously described, it may further include two uniaxially suspended mirrors, such as two uniaxially suspended micromechanically manufactured mirrors journaled about two axes perpendicular to each other. The two movable, for example micromechanically manufactured mirrors are arranged such that the light beam incident on the mirrors may be deflected two-dimensionally. Basically, the deflection means could, however, also comprise a suitable arrangement of beam-diffractive elements or a combination thereof with mirrors.

Furthermore, although a laser has been previously described as light source, also a laser diode or another suitable light source may be used. It is also possible that externally generated light is guided to a deflection means via a glass fiber or another suitable means, so that the projection apparatus itself has no light source.

The modulation of the control signal or the intensity modulation of the light source may be performed by a further element, a so-called modulator, deviating from the previous description, so that modulation of the light source intensity and rendition of the image data are executed in various elements. As it has previously been mentioned, the rendition does not have to be performed in the projector, but it may further be provided that the image data are already present in a suitable format.

Furthermore, the present invention is not only applicable to monochrome projectors but also suited for the colored representation or projection. For example, several light sources may be provided, such as various lasers, whose beams are for example merged by a beam splitter and directed on the deflection means.

In a realization of the projection apparatus of FIG. 1, substantial elements of the circuit of the modulation unit or modulation means may be realized as a printed circuit board (PCB) with discrete devices, such as surface mounted devices (SMD), or as an IC (integrated circuit).

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Projection apparatus for projecting an image on an image field, comprising:
    a deflection means for deflecting a light beam about a first deflection axis and about a second deflection axis in order to move the light beam across the image field; and
    a modulation means for modulating an intensity of the light beam depending on the image to be projected, wherein the first and second deflection frequencies differ by less than an order of magnitude,
    characterized in that
    the deflection means is formed such that the light beam is deflected about the first deflection axis at a first deflection frequency $f_1$ and about the second deflection axis at a second deflection frequency $f_2$, wherein the deflection means comprises means adjusting the frequency ratio to $f_1:f_2=n:m$, with m and n being unequal integers, so that the light beam describes a Lissajous figure on the image field and repeatedly passes through it with a repetition frequency $f_r$ of $f_r=f_1/n=f_2/m$.

2. Projection apparatus of claim 1, wherein the deflection means has a first resonance frequency with reference to the deflection about the first deflection axis and a second resonance frequency with reference to the deflection about the second deflection axis, and wherein the first deflection frequency lies in the vicinity of the first resonance frequency and the second deflection frequency in the vicinity of the second resonance frequency.

3. Projection apparatus of claim 1, wherein the first and second deflection frequencies are greater than 500 Hz and n and m are greater than 10.

4. Projection apparatus of claim 1, wherein the difference between n and m is 1.

5. Projection apparatus of claim 1, wherein the image to be projected is defined by pixels arranged as an array in columns and rows, wherein each pixel is associated with an image area on the image field and wherein the deflection means deflects the light beam such that the light beam crosses through image areas of different rows on the image field before it has reached all image areas of a complete row.

6. Projection apparatus of claim 5, wherein the modulation means is adapted to modulate the intensity of the light beam depending on in which of the image areas a momentary projection place of the light beam in the image field is and according to the pixel associated with the image field in which the momentary projection place of the light beam is.

7. Projection apparatus of claim 1, wherein the deflection means comprises:
    a means for fading out the light source as soon as the light beam is deflected in a margin area of the image field by the deflection means.

8. Projection apparatus of claim 1, wherein the modulation means performs the modulation of the intensity of the light beam based on a momentary projection place of the light beam on the image field and image data defining the image.

9. Projection apparatus of claim 8, wherein the modulation means comprises:
    a means for determining the momentary projection place based on either a momentary first and second deflection angle of the light beam or based on a time signal using a predetermined connection between the first and second momentary deflection angles of the light beam and the time.

10. Projection apparatus of claim 1, wherein the deflection means comprises:

a synchronization means for sending the time signal to the modulation means for the synchronization of the modulation means with the deflection means, wherein the time signal indicates reversal points in the deflections of the light beam by the deflection means.

11. Projection apparatus of claim 1, wherein the deflection means is arranged to send information about the first and second momentary deflection angles to the modulation means.

12. Projection apparatus of claim 1, wherein the modulation means is arranged to feed a reference voltage to the deflection means, which has a progress in time corresponding to a target progress in time of at least a first or a second momentary deflection angle of the light beam.

13. Projection apparatus of claim 1, wherein the deflection means is arranged to send a trigger signal to the modulation means.

14. Projection apparatus of claim 1, further comprising:

a rendition means for changing an order of pixel values in an input data stream defining the image and for feeding a control signal to the modulation means, which corresponds to the input data stream in changed order.

15. Projection apparatus of claim 1, further comprising:

a rendition means for interpolating the image at positions corresponding to image points of the image field, in order to obtain interpolation values, wherein the modulation means is adapted to perform the modulation on the image points based on the interpolation values.

16. Projection apparatus of claim 1, wherein the deflection means includes either one biaxially suspended movable mirror or two uniaxially suspended movable mirrors.

17. Projection apparatus of claim 1, which further comprises a light source for creating the light beam.

18. Projection apparatus of claim 1, wherein the projection apparatus is a miniaturized projection apparatus in which the deflection means comprises one biaxially suspended or two uniaxially suspended mirrors that are micromechanically manufactured.

19. Method for projecting an image on an image field comprising:

deflecting a light beam about a first deflection axis and about a second deflection axis, in order to move the light beam across the image field; and modulating an intensity of the light beam depending on the image to be projected, wherein the first and second deflection frequencies differ by less than an order of magnitude, characterized in that the step of deflecting is performed such that the light beam is deflected about the first deflection axis at a first deflection frequency $f_1$ and about the second deflection axis at a second deflection frequency $f_2$, for which $f_1:f_2=n:m$ applies for unequal integers n and m, so that the light beam describes a Lissajous figure on the image field and repeatedly passes through it with a repetition frequency $f_r$ of $f_r=f_1/n=f_2/m$.

* * * * *